(No Model.)

J. V. HOFFMAN.
Lathe Tool.

No. 233,509.   Patented Oct. 19, 1880.

UNITED STATES PATENT OFFICE.

JOSEPH V. HOFFMAN, OF RARITAN, NEW JERSEY.

LATHE-TOOL.

SPECIFICATION forming part of Letters Patent No. 233,509, dated October 19, 1880.

Application filed May 10, 1880. (No model.)

*To all whom it may concern:*

Be it known that I, JOSEPH V. HOFFMAN, of Raritan, in the county of Somerset and State of New Jersey, have invented a new and useful Improvement in Lathe-Tools, of which the following is a specification.

The object of my invention is to prevent the springing of the work and the chattering of the cutting-tool when a shaft or other piece of work is being turned, faced off, or centered in a lathe.

The invention consists in a novel construction of a device for grasping the work and for holding the cutting-tool steadily in contact therewith, as hereinafter described.

Figure 1:
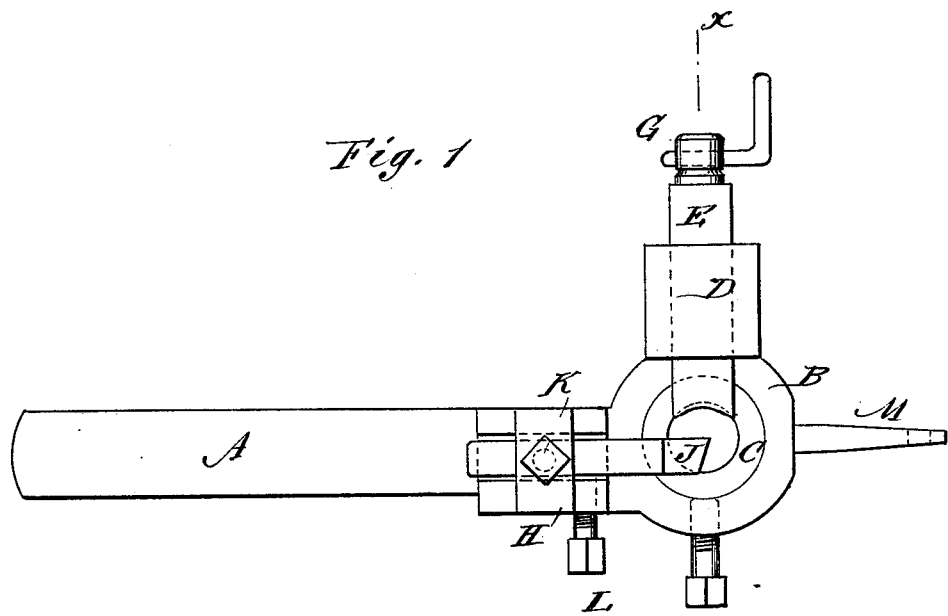
Figure 2:
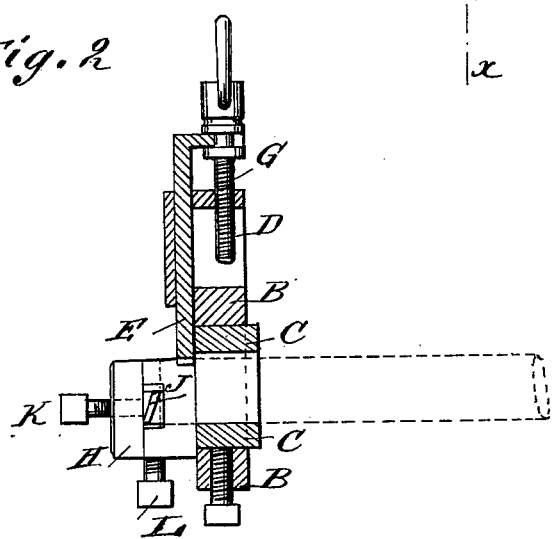

In the accompanying drawings, Figure 1 is a side view of a device embodying my improvements, and Fig. 2 is a transverse section taken in the line $x\ x$ of Fig. 1.

Similar letters of reference indicate corresponding parts.

A represents the shank, which is secured in the socket of the tool-carrier of the lathe in the same manner as that in which the cutting-tool is usually secured. The outer end of this shank is enlarged into a ring, B, in which is fitted a removable bushing, C, made preferably of steel. To the upper portion of the ring B is attached a box, D, in which works a sliding bar, E, which is vertically adjustable by means of a screw, G. On the shank A and ring B, at a point about ninety degrees from the box D, is another box, H, which constitutes the tool-holder. The cutting-tool J is arranged to slide in this box, and is held securely in place therein by means of two set-screws, K and L. To the ring B, at a point about opposite the box H, is attached a projecting bar or plate, M, which may be employed as a rest for a water-pot or oil-can.

The work to be turned is passed through the bushing C, the shank A is secured in the tool-carrier, and the work is adjusted between the lathe-centers. The screw G is then turned, so as to cause the lower end of the bar E to bear against the work and hold it steadily against the bushing C. The cutting-tool J is then adjusted to the work and the turning process proceeds in the usual manner.

By means of this device the work is prevented from vibrating or springing away from the cutting-tool, which is held firmly and uniformly up to the work, so as to make a smooth and uniform cut throughout the entire extent of its travel.

This device may be used with great advantage in a screw-cutting lathe to prevent springing of the work when cutting a screw-thread.

Having thus described my invention, I claim as new and desire to secure by Letters Patent—

1. The lathe-tool herein described, consisting of the shank A and ring B, provided with the bushing C, and having attached thereto the box D, carrying the vertically-adjustable sliding bar E, as shown and set forth, for the purpose specified.

2. The combination, with the shank A and ring B, of the tool holder or box H, carrying the cutting-tool J, and provided with the set-screws K and L, as shown and described, for the purpose specified.

JOSEPH VAN SYCKEL HOFFMAN.

Witnesses:
SAML. L. VOORHEES,
GEO. W. MADISON.